Figure 1:
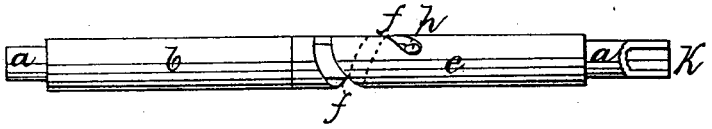
Figure 2:
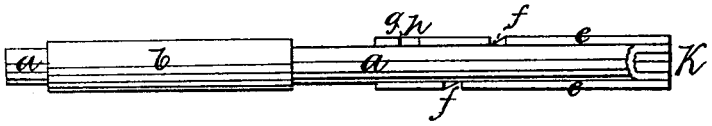

D. F. Elmer,

Watch-Chain Attachment,

No. 298. A. I. Patented Oct. 2, 1860.

Witnesses:
J. W. Coombs
A. S. Spencer

Inventor:
D. F. Elmer
per Munn & Co
Attorneys.

AM. PHOTO-LITHO. CO. N.Y. (OSBORNE'S PROCESS.)

DEPARTMENT OF COMMERCE
UNITED STATES PATENT AND TRADEMARK OFFICE

---

MISSING PAGE(S)

PATENT NUMBER AI 298 FOR THE ISSUE DATE 10/02/1860 HAS BEEN SCANNED/LOADED, BUT WITH MISSING PAGES(S). UPON RECEIPT OF THE MISSING PAGE(S), THE ENTIRE DOCUMENT WILL BE RESCANNED.

THIS NOTICE IS FOR THE MISSING PAGE(S) CONTAINING:

All Text / Claims